(12) United States Patent
Shuder et al.

(10) Patent No.: US 7,533,042 B2
(45) Date of Patent: May 12, 2009

(54) METHOD AND SYSTEM FOR PROCESSING TIMECARD RELATED INFORMATION IN A PURCHASE ORDER PROCUREMENT SYSTEM

(75) Inventors: James Shuder, San Carlos, CA (US); Sridatta Viswanath, Santa Clara, CA (US); Shailesh Prakash, Santa Clara, CA (US); Kishor Kakatkar, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1574 days.

(21) Appl. No.: 09/982,211

(22) Filed: Oct. 17, 2001

(65) Prior Publication Data

US 2003/0074287 A1    Apr. 17, 2003

(51) Int. Cl.
    *G06Q 10/00* (2006.01)
(52) U.S. Cl. .............................. 705/28; 705/1; 705/26
(58) Field of Classification Search ................. 705/28, 705/1, 26
    See application file for complete search history.

(56) References Cited

U.S. PATENT DOCUMENTS

| | | | | |
|---|---|---|---|---|
| 4,383,298 | A * | 5/1983 | Huff et al. | 705/28 |
| 5,216,612 | A * | 6/1993 | Cornett et al. | 700/96 |
| 6,289,317 | B1 * | 9/2001 | Peterson | 705/7 |
| 6,609,108 | B1 | 8/2003 | Pulliam et al. | |
| 6,832,176 | B2 * | 12/2004 | Hartigan et al. | 702/178 |
| 7,010,493 | B2 * | 3/2006 | Yamamoto et al. | 705/1 |
| 2001/0047311 | A1 | 11/2001 | Singh | |
| 2001/0051889 | A1 * | 12/2001 | Haney | 705/8 |
| 2002/0023045 | A1 | 2/2002 | Feilbogen et al. | |
| 2002/0052801 | A1 * | 5/2002 | Norton et al. | 705/26 |
| 2002/0065693 | A1 | 5/2002 | Hattori et al. | |
| 2002/0069145 | A1 * | 6/2002 | Collado et al. | 705/32 |
| 2002/0069157 | A1 | 6/2002 | Jordan | |
| 2002/0091533 | A1 | 7/2002 | Ims et al. | |

(Continued)

OTHER PUBLICATIONS

Yesko et al., "Nonprofit accounting with PC fund", PC Magazine, vol. 4 No. 13, p. 138, Jun. 25, 1985.*

(Continued)

*Primary Examiner*—F. Zeender
*Assistant Examiner*—Christopher Buchanan
(74) *Attorney, Agent, or Firm*—Robert C. Kowert; Meyertons, Hood, Kivlin, Kowert & Goetzel, P.C.

(57) ABSTRACT

A computer software tool for processing timecard related information representing services to be billed wherein the software tool is part of a purchase order procurement system. The software tool is single software system for procurement services composed of a timecard module integrated with a procurement management module. The timecard process includes a base of functions compatible with existing procurement software systems. The system allows a contractor (buyer) to generate a timecard including services, descriptions and amounts. The generation of the timecard triggers a notification to an approving body which then either approves or declines the timecard. Once approved, timecard information can be exported, e.g., using XML, to a payroll or other external service. The timecard information is processed by the procurement system like any other purchase order item and, moreover, the suites of functionality of the procurement system that relate to purchase order items are also available for timecard information. Approvals can be accomplished by email transmitted notifications and email transmitted forms.

22 Claims, 12 Drawing Sheets

U.S. PATENT DOCUMENTS

| | | |
|---|---|---|
| 2002/0107699 A1 | 8/2002 | Rivera et al. |
| 2002/0116205 A1 | 8/2002 | Ankireddipally et al. |
| 2002/0133569 A1 | 9/2002 | Huang et al. |
| 2002/0156687 A1 | 10/2002 | Carr et al. |
| 2002/0174000 A1 | 11/2002 | Katz et al. |
| 2002/0178021 A1 | 11/2002 | Melchior et al. |
| 2002/0184070 A1 | 12/2002 | Chen et al. |
| 2002/0184145 A1 | 12/2002 | Sijacic et al. |
| 2002/188524 A1 | 12/2002 | Shimizu |
| 2003/0061121 A1 | 3/2003 | Ouchi |
| 2003/0078798 A1* | 4/2003 | Zaks et al. ............... 705/1 |
| 2003/0139975 A1 | 7/2003 | Perkowski |
| 2003/0177051 A1* | 9/2003 | Driscoll et al. ............ 705/9 |
| 2003/0204367 A1 | 10/2003 | Hartigan et al. |
| 2004/0260601 A1 | 12/2004 | Brief |
| 2005/0049903 A1 | 3/2005 | Raja |

OTHER PUBLICATIONS

"State of the Art's MAS 90(R) accounting . . . ", PR Newswire, Feb. 19, 1998.*

* cited by examiner

The XML file adheres to the following DTD:

```
<!ELEMENT Timecard  (TimecardHeader , TimecardDetail ,
TimecardSummary )>

<!ELEMENT TimecardHeader  (TimecardReference , TimecardDate ,
TimecardPeriod ,
ClientParty, ContractingParty , CurrencyCode )>

<!ELEMENT TimecardDetail  (LineItem+ )>

<!ELEMENT TimecardSummary %TimecardSummaryRef;>
```

FIG. 10

METHOD AND SYSTEM FOR PROCESSING TIMECARD RELATED INFORMATION IN A PURCHASE ORDER PROCUREMENT SYSTEM

BACKGROUND OF THE INVENTION

1. Field of the Invention

The present invention relates to the field of computer controlled procurement services. More particularly, the present invention relates to the management of contract labor by integrating a contractor timecard system and a purchase order procurement system.

2. Related Art

Computer controlled software systems presently available for the management of contract labor generally are stand alone, separate, computer programs that process only timecard related information. These "timecard" processing systems are not integrated with purchase order procurement systems (e.g., for generating purchase requisitions). Purchase order procurement systems are used today to facilitate the purchase, management and acquisition of "hard" items, e.g., goods such as hardware, materials, equipment, etc. However, purchase order procurement systems do not process timecard related information, e.g., regarding contract labor, services, etc.

As a result, companies typically engage two separate procurement programs and systems in order to support timecard processing for services and purchase order procurement for goods.

However, the use of separate computer systems and separate computer programs to perform both computerized purchase order procurement and timecard processing has a number of inherent disadvantages. First, separate procurement software programs are disadvantageous from an expense point of view because two different software programs need to be purchased and maintained by software professionals. Version updates and system troubleshooting are made more difficult because different programs need to be addressed differently.

The management of two separate software systems for performing timecard processing and purchase order procurement typically requires a doubled effort regarding training, software maintenance, etc. Different software programs typically have different input and output formats and have different operational and procedural requirements. Therefore, the user is burdened with the tasks of learning and remembering different operating requirements and formats to perform procurement. The techniques and data formats used for timecard processing on one system may be totally incompatible with the techniques and data formats used to perform purchase order generation and approval with respect to another system. As such, the use of multiple software programs leads to a decrease in system efficiency.

Moreover, the use of multiple software programs to perform timecard processing and purchase order procurement may in fact require additional computer memory or hardware, and may even require additional computer peripherals.

SUMMARY OF THE INVENTION

Accordingly, what is needed is a more generally applicable method that solves the above problems by incorporating both service related (e.g., timecard) and purchase order related procurement services within a single computerized procurement system. What is also needed is a timecard system that facilitates communication between contractors and buyers, e.g., by using the Internet and electronic mail systems. The present invention provides these advantages and others not specifically mentioned above but described in sections to follow.

A computer software tool is described for processing timecard related information representing services to be billed wherein the software tool is part of a purchase order procurement system. The software tool is a single software system for procurement services composed of a timecard module integrated with a procurement management module. The timecard process includes a base of functions compatible with existing procurement software systems. The system allows a contractor (buyer) to generate a timecard including services, descriptions and amounts. The generation of the timecard triggers a notification to an approving body which then either approves or declines the timecard. Once approved, timecard information can be exported, e.g., using XML, to a payroll or other external service. The timecard information is processed by the procurement system like any other purchase order item and, moreover, the suites of functionality of the procurement system that relate to purchase order items are also available for timecard information. Approvals can be accomplished by email transmitted notifications and email transmitted forms.

More specifically, embodiments are directed to an integrated software system for procurement services composed of a timecard process integrated with purchase order procurement management functions. The system manager has the ability to monitor contractor activity, to verify approval of contractor requisitions and affect contractor payment for services performed. The system may be html based and therefore can be available to all users via the World Wide Web. Security over the World Wide Web is provided by means of a set of confidentiality rules for contractors, for buyers, and for system administrators.

Components of the present invention are directed to contractor (buyer) functionality, approver functionality and administrator functionality. The following components work together to create the timecard process. A timecard project table listing all projects is entered into the system. Each project has a name, a description, types of hours allowed, and a unique ID number. A contractor profile entered into the system includes name, employer, project, work type, hourly rate, contract monitor or approver, and the project ID number. A set of timecard business rules describing timecard availability and timecard approval processes are entered into the system. A procurement system approval matrix software is set up for the system. A contractor is then allowed to enter into the system timecard data of hours worked. The timecard is tracked and goes through the approval process. After approval, the timecard is sent to the legacy system where statistics are gathered, and to procurement services for contractor payment.

In one embodiment, the buyer interface may be browser based so that timecard entry and generation thereof can be performed by the buyer using the Internet, with the procurement system being hosted on a remote server. Once a timecard is generated, the procurement system automatically generates and forwards a notification to the appropriate approver for the timecard. This notification may be an email message to the mailbox of the approver. Emails relating to purchase order items and timecards can be mixed within the approver's mailbox.

In one embodiment, the approver opens the email notification and has all of the information relating to the timecard displayed, including special accounting codes which may or may not be available to the buyer. Along with the email notification is a special form allowing the approver to either approve or decline all or part of the timecard information. This form is then automatically forwarded, via email, back to the procurement system in a mechanism that is transparent to the user thereby allowing the approval process to be accomplished via email. In this case, the approver need not directly log into the procurement system to perform the approvals.

The procurement system also advantageously generates XML formatted information for export to external applications. Therefore, once approved, the timecard information can be formatted into an XML that is then transmitted to an external payroll service for generating the payment to the contractor (buyer). Transmission of the XML data may be performed using ECX. Additionally, an administrator may define projects, define contractor profiles and may setup rules pertaining to the timecard entry and generation process including security options.

One implementation of the present invention provides methods for processing contractor timecard data in an integrated procurement system that also processes purchase order requisitions for goods. In this embodiment, the mechanism for contractor timecard input can be an html based system, and thus contractors can communicate with the server-based procurement system via the World Wide Web. What is described is the treatment of contractor time card data by means of timecard software programs integrated with purchase order requisition procurement software programs. In this integrated procurement system, mechanisms for the approval of a contractor request for compensation are included and, after approval, contractor payment for services is treated as a normal purchase requisition. More specifically, a first embodiment of the present invention includes gathering and processing of statistical data which is then made available to the legacy portion of the procurement system.

Another embodiment of the present invention describes a system wherein a contractor can communicate a request for compensation for services rendered into an integrated procurement system. The procurement system is html based which allows the contractor to utilize the World Wide Web when communicating with the system. In this embodiment, the generation of a timecard automatically causes a notification to be forwarded, via an email message, to the approver associated with the contractor. The notification appears in the approver's email mailbox and contains a special approver form that includes all of the timecard information including some accounting codes not available to the contractor. Accounting codes can be used to relate projects to contractors and vice-versa. The approver can approve or decline the timecard, via the email message, and a response email message is then automatically forwarded to the procurement system. In this way, the approver need not specifically take steps to log-in to the procurement system in order to perform approvals thereby saving steps and time. If approved, the timecard can be converted into a purchase order for export to other programs or entities (e.g., a payroll service) for the payment of the contractor services.

BRIEF DESCRIPTION OF THE DRAWINGS

FIG. 6 is a computer screen display showing a window used to set up a timecard project according to an embodiment of the present invention.

FIG. 7 is a computer screen display showing a window used to set up a contractor profile according to an embodiment of the present invention.

FIG. 10 illustrates exemplary XML code used by an embodiment of the present invention for exporting information.

DETAILED DESCRIPTION OF THE INVENTION

Figure 1:
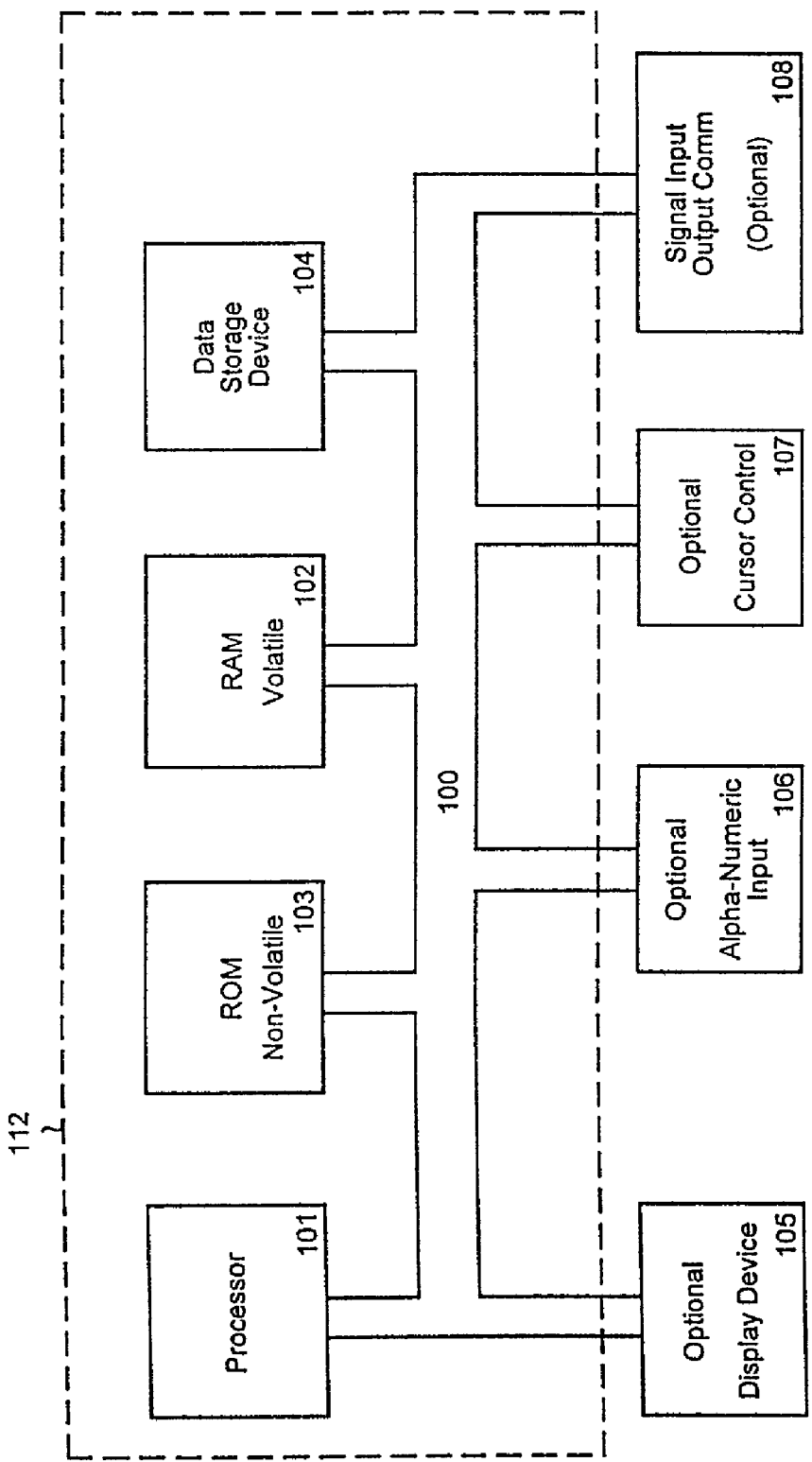
FIG. 1 is a general purpose computer system on which embodiments of the present invention may be implemented.

In the following detailed description of the present invention, an integrated procurement software system for processing both timecard information and purchase order acquisitions, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those utilizing physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "comparing," "accessing," "processing," "computing," "suspending," "resuming," "translating," "calculating," "determining," "scrolling," "displaying," "recognizing," "executing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer System 112

Aspects of the present invention, an integrated procurement software system for processing both timecard information and purchase order acquisitions, are discussed in terms of steps executed on a computer system. Aspects of the present invention are also discussed with respect to an Internet system including electronic devices and servers coupled together within the Internet platform. A "server" or the browser based buyer system can be implemented as a general purpose computer system. Although a variety of different computer systems can be used with the present invention, an exemplary computer system 112 is shown in FIG. 1.

Exemplary computer system 112 comprises an address/data bus 100 for communicating information, a central processor 101 coupled with the bus for processing information and instructions, a volatile memory 102 (e.g., random access memory) coupled with the bus 100 for storing information and instructions for the central processor 101 and a non-volatile memory 103 (e.g., read only memory) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

Also included in computer system 112 is an alphanumeric input device 106 including alphanumeric and function keys coupled to the bus 100 for communicating information and command selections to the central processor 101. Generally, alphanumeric input device 106 is called a keyboard or keypad. System 112 also includes a cursor control or directing device 107 coupled to the bus for communicating user input information and command selections to the central processor 101. Within the context of the present invention, the cursor directing device 107 can include a number of implementations including a mouse device, for example, a trackball device, a joystick, a finger pad (track pad), an electronic stylus, an optical beam directing device with optical receiver pad, an optical tracking device able to track the movement of a user's finger, etc., or any other device having a primary purpose of moving a displayed cursor across a display screen based on user displacements.

Computer system 112 of FIG. 1 can also include an optional signal generating device 108 coupled to the bus 100 for interfacing with other networked computer systems, e.g., over the Internet. The display device 105 of FIG. 1 utilized with the computer system 112 of the present invention may be a liquid crystal device, other flat panel display, cathode ray tube, or other display device suitable for creating graphic images and alphanumeric characters recognizable to the user.

Integrated Timecard Information and Purchase Order Procurement System

Figure 2:
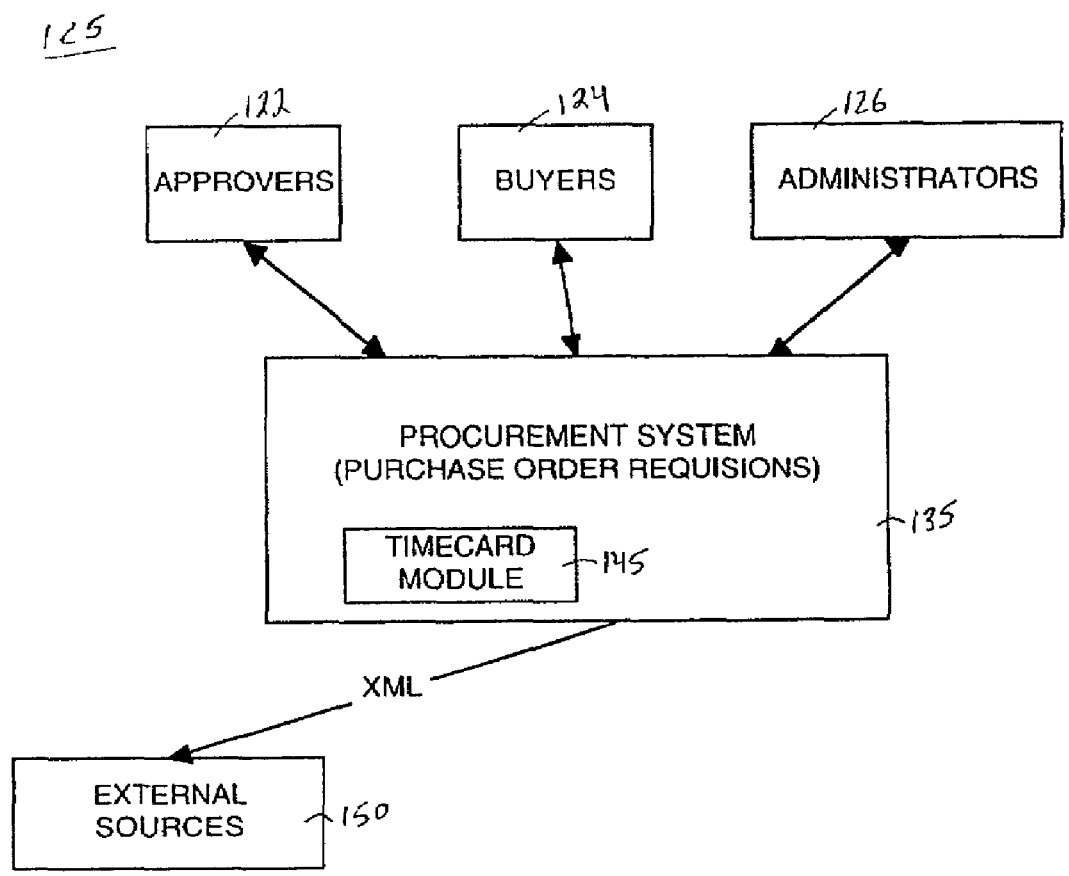
FIG. 2 illustrates a high level block diagram of one embodiment of the present invention illustrating data flow inputs and possible data flow outputs.

FIG. 2 illustrates a high level block diagram 125 of one embodiment of the present invention illustrating data flow inputs and possible data flow outputs. A computer implemented procurement system module 135 for processing purchase order requisitions is integrated with a compatible timecard module 145 for processing buyer (contractor) timecard data. Within these two modules, approved timecard information is then processed like any other purchase order. Therefore, the procurement system 135 provides procurement processing for both goods related and service related purchase orders.

Therefore, the timecard process is a method for capturing contractor hours into the software of a procurement system so the tracking and approval processes of the procurement system can be used. If an organization is set up to use the timecard process, contractors are able to enter their hours into a timecard screen in the procurement user interface. The timecard hours that are entered here forms the basis for the timecard requisition. When a timecard is submitted, it goes through the approval process and is available to be tracked. After the timecard requisition is approved, it is sent to the legacy system of the organization as well as to payroll services to implement contractor compensation. An approved timecard requisition is treated within the procurement system just like any other purchase requisition.

Administrators 126 of FIG. 2 interface with system 135 to establish timecard user information, set up projects for timecards, set up timecard business rules, establish contractor ("buyer") profiles, and communicate this information to both the procurement system module 135 and the timecard module 145. User (contractor) information can include name, project, work type, hourly rate, contract approver and project ID number. Each project has a name, description, types of hours allowed and a unique ID. The timecard business rules determine availability of the system to the user as well as a procurement system approval matrix. In addition, the importation of timecard data, the generation of timecard reports as well as cancellation of timecard requests can be accomplished by the administrators 126. Finally, mapping of timecard data is communicated in XML to the external sources module 150 which includes the legacy system where statistical data is gathered as well as procurement services where user (contractor) payments are generated.

The buyers ("contractors") 124 of FIG. 2 interface with system 135 to enter into the system timecard data of hours worked. This buyer module 124 may be browser based so that timecard data entry can be performed by means of the internet, with the procurement system 135 being hosted on a remote server.

Importantly, the timecard module 145 receives electronic timecard data from the buyers 124 and generates an approval notification that is transmitted by electronic mail, in one embodiment, to the approvers module 122. Approvers 122 interface with system 135 in order to approve or decline timecards. The approval notification is a special form that allows an approver to approve or decline all or part of the timecard information. Buyers are associated with approvers through system 135 and its databases. The completed notification form is then automatically transmitted electronically back to the procurement system 135 wherein the approved timecard data is processed as any other purchase order.

FIG. 2 also illustrates external sources 150. These represent external applications or institutions that can operate on data produced by the procurement system 135. For instance, an external source 150 could be a payroll service that takes completed (and approved) timecard purchase orders and generates payroll checks therefrom. In accordance with embodiments of the present invention, data exported to these systems 150 is formed into an XML data format to facilitate information exchange.

Figure 3:
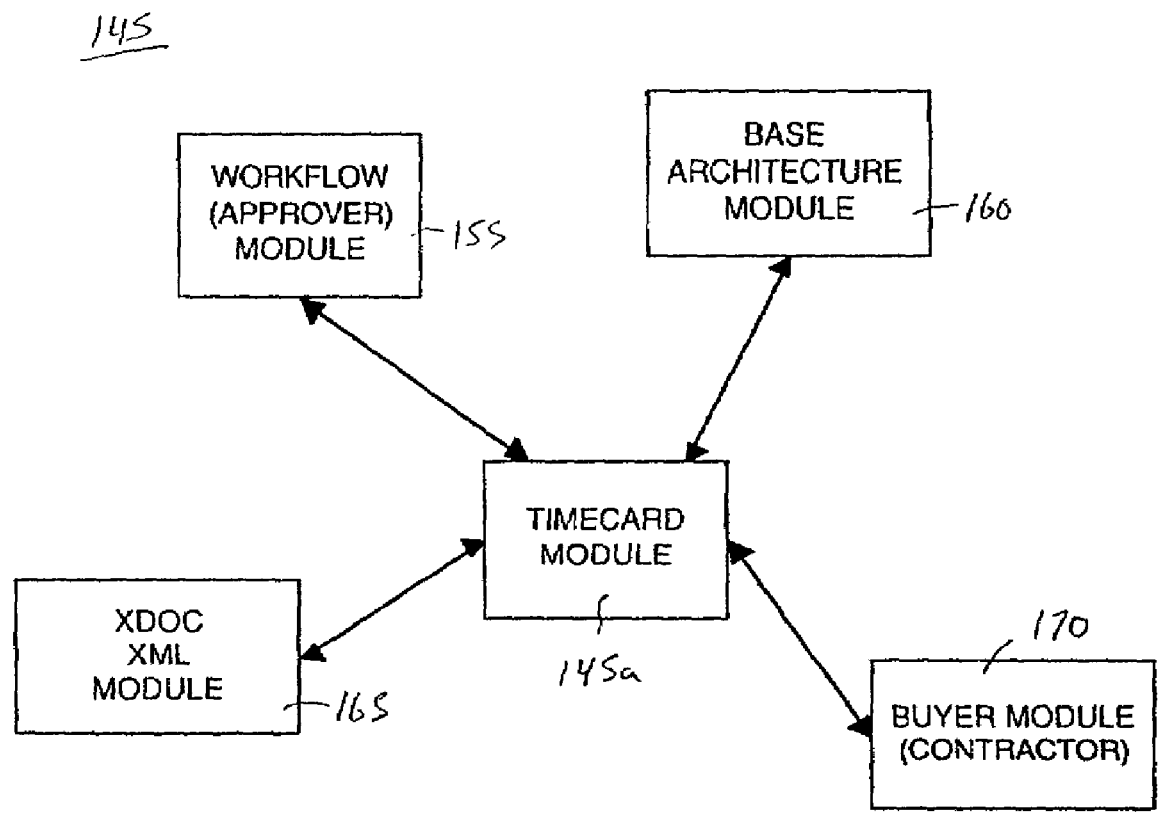
FIG. 3 is a data flow diagram showing information flow between various software modules of the procurement system with timecard functionality according to one embodiment of the present invention.

FIG. 3 illustrates a data flow diagram 145 of information flow between various software modules of the procurement system 135 that are used to establish the timecard functionality. The base architecture module 160 consists of data structures, e.g., object classes, base-level objects, which include a base of functions compatible with existing procurement software systems, e.g., compatible with requisition purchase order functionality for goods procurement. These base classes are extended and used by the timecard module 145a. The timecard process provides for the generation of timecard information within the timecard module 145a which is then directed to the base architecture module 160. Through this sharing of the object classes 160, the suites of functionality of the procurement system 135 that relate to purchase order items (e.g., goods procurement) are then made available for timecard information which is then processed by procurement system software 135 like any other purchase requisition item. In this way, processes that are used for good procurement can be readily extended to process timecard related information by module 145a.

Figure 4A:
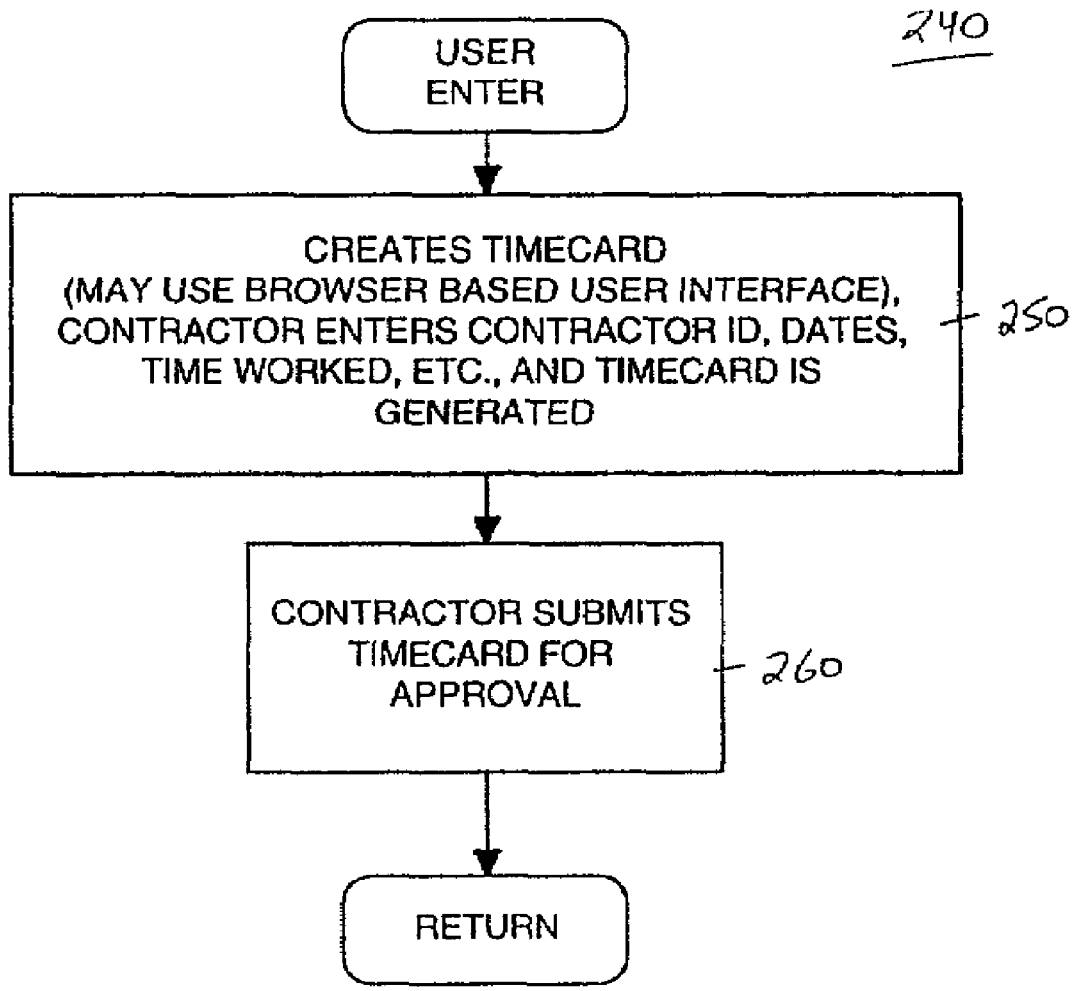
FIG. 4A illustrates a flow diagram of computer implemented steps relating to contractor (buyer) activity in accordance with the procurement system with timecard functionality of one embodiment of the present invention.

The buyer module 170 allows a contractor to generate an electronic timecard for submission to the timecard process 145a. Process steps of FIG. 4A are facilitated by the buyer module 170. Herein, the terms "a contractor" and "a buyer" are used as the same. Using module 170 of FIG. 3, a contractor is allowed to enter number of hours worked, type of work performed, dates and/or times of work performed relative to a specific project. The contractor interface may be browser based so that timecard entry and generation can be performed by the contractor using the Internet, with the timecard process system being hosted on a remote server. The buyer's timecard information is forwarded to module 145a when complete.

Figure 8:
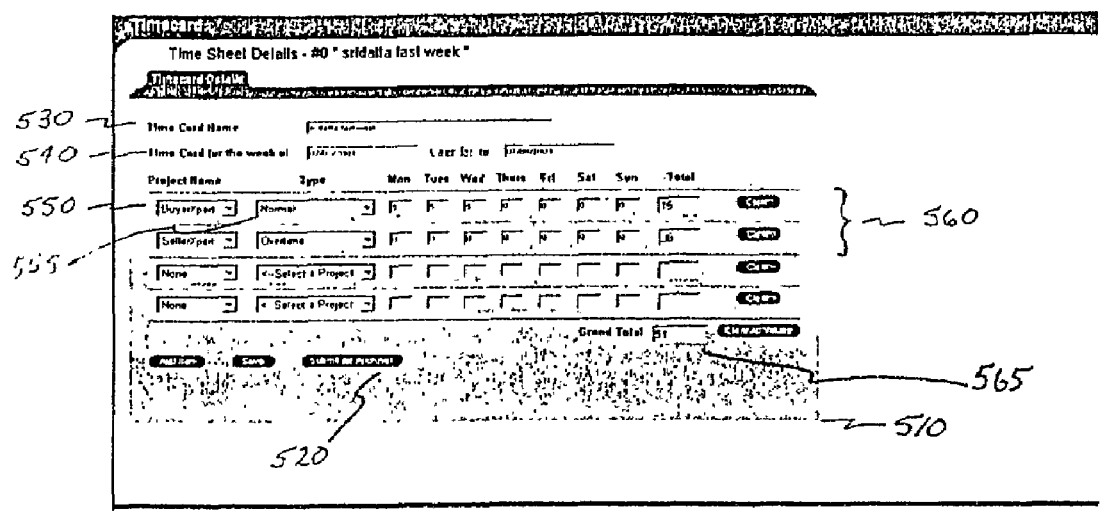
FIG. 8 is a computer screen display showing a window used to enter contractor timecard data in one embodiment of the present invention.

FIG. 8 is an exemplary computer screen display 500 showing a window 510 used to enter contractor timecard data in one embodiment of the present invention that can be used in the buyer module 170. Timecard name 530, dates spanning time worked 540, project or contractor ID 550, a description of services rendered 555, subtotals of hours worked 560 and hours worked 565 are entered in the appropriate spaces on the timecard details window 510. Selecting "submit for approval" button 570 enters a request for payment into the timecard system. The window 510 can be implemented on a browser-based system.

Figure 4B:
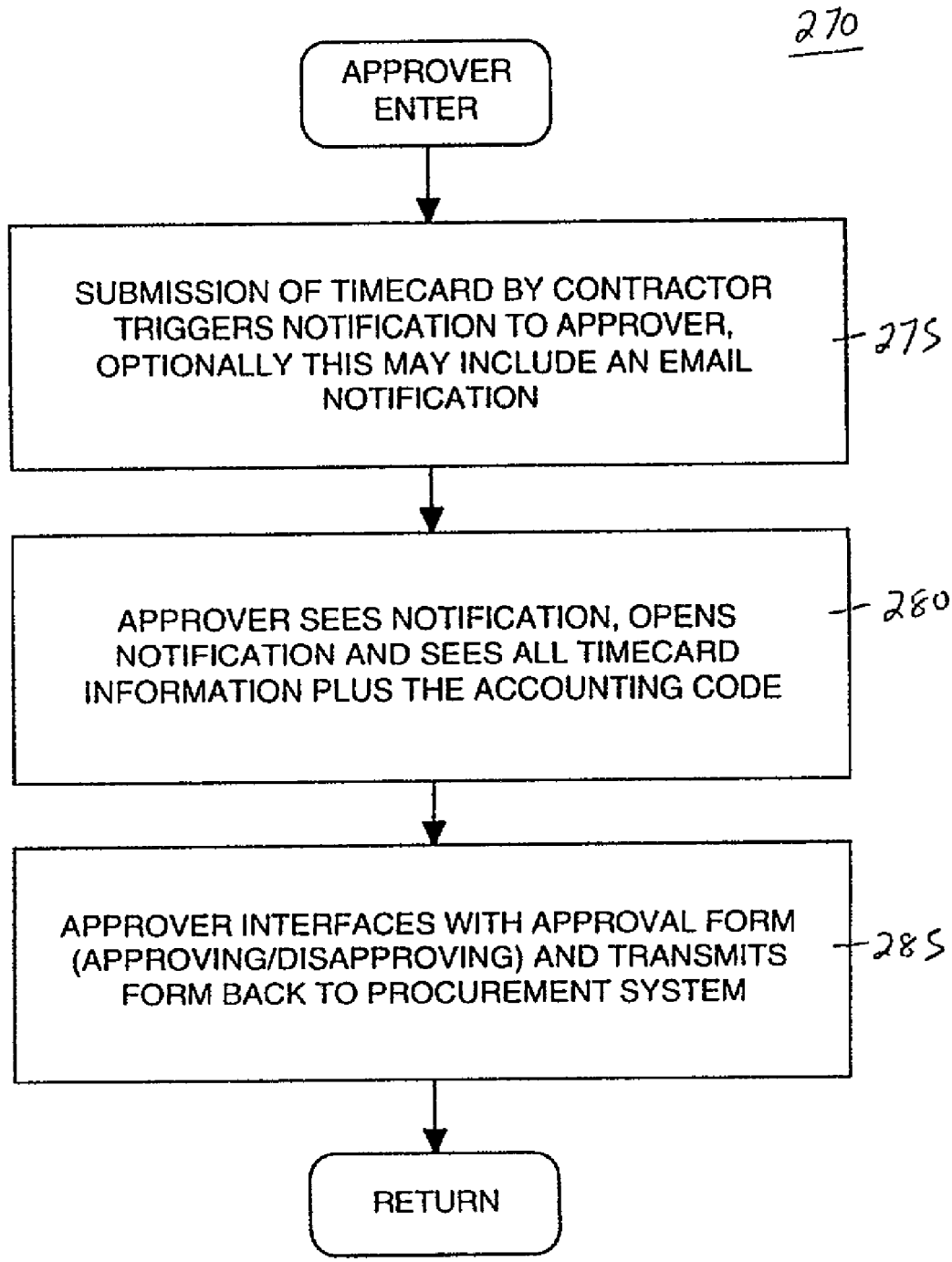
FIG. 4B illustrates a flow diagram of computer implemented steps relating to approver activity in accordance with the procurement system with timecard functionality of one embodiment of the present invention.

Once an electronic timecard is generated by a buyer, a notification is automatically generated by the buyer module 170 to the timecard module 145a (FIG. 3) and transmitted to the workflow (approver) module 155. The workflow module 155 of FIG. 3 is directed at providing an approval process for electronic timecards. The approval process requires that an associated approver (e.g., a manager) approve a specific timecard. The notification facilitates this process. The approval process as performed by the workflow module 155 is also shown in the steps of FIG. 4B.

In one embodiment, the approval notification may be an email message. In this embodiment, the workflow module 155 will forward the notification, as an email, to the mailbox of the appropriate approver. The approver opens the email notification and has all of the information relating to the timecard displayed, including special accounting codes which may or may not be available to the buyer. Along with the email notification is a special form allowing the approver to either approve or decline all or part of the timecard information. This form is then automatically forwarded, via email, back to the procurement system in a mechanism that is transparent to the user thereby allowing the approval process to be accomplished via email. In this case, the approver need not directly log into the procurement system to perform the approvals.

Figure 9:
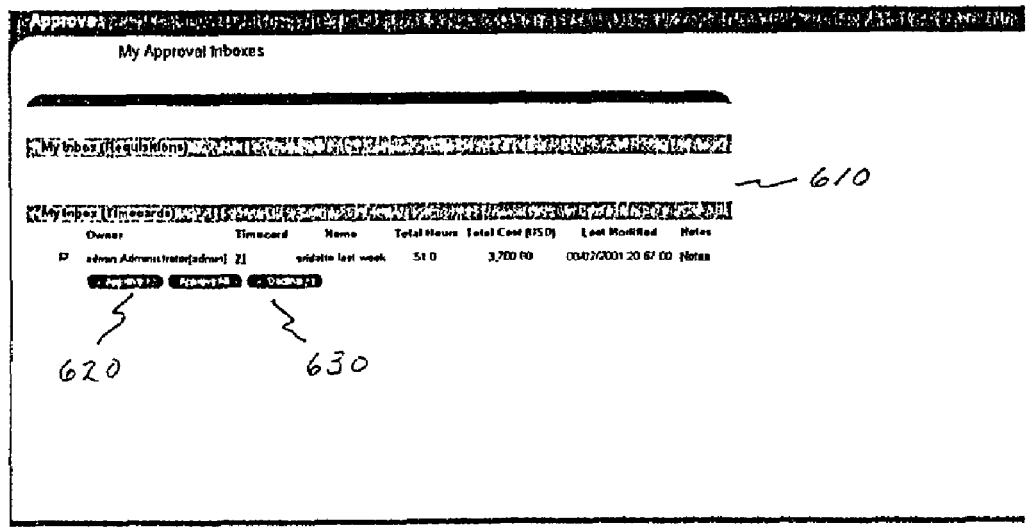
FIG. 9 is a computer screen display showing a window used to display contractor timecard data presented for approval in one embodiment of the present invention.

FIG. 9 is an exemplary computer screen display 600 showing a window 610 used to display contractor timecard data presented for approval in one embodiment of the present invention. An approver can review and approve the request for processing and contractor payment by opening the email message and selecting the "Approve" 620 button. FIG. 9 illustrates an exemplary in-box of the approver's email program. The request can also be denied by selecting the "Decline" 630 button. In either case, the approver need not exit the email program to approve or decline the request. For instance, after the buttons on the form are activated, a message is automatically generated and forwarded to the timecard module 145a indicating an approval or a decline of the services. It is appreciated that the in-box may contain requests for other services (from other buyers) and/or may contain purchase orders (needing authorization) relating to goods.

The XDOC XML module 165 of FIG. 3 generates XML formatted timecard information for export to external applications. XML formatted data provides a generic or universal data exchange format to facilitate external applications interfacing with the timecard data. Timecard requests approved in workflow (approver) module 155 are returned by email to the timecard module 145a. The procurement system may then forward approved timecards to the XDOC XML module 165. Transmission of XML data may be performed using ECX. External services receiving XML timecard information include system legacy where statistical data are produced and disseminated as well as payment services for generating payment to the contractor. An example of XML code 710 used for exporting timecard information is illustrated in FIG. 10.

FIG. 4A illustrates a flow diagram of computer implemented steps relating to contractor (buyer) activity 240 in accordance with the procurement system with timecard functionality of one embodiment of the present invention. In step 250, a timecard is generated as a contractor enters number of hours worked, type of work performed, dates and/or times of work performed relative to a specific project that is identified with a unique ID. The contractor interface may be browser based so that timecard entry and generation can be performed by the contractor using the internet, with the timecard process system being hosted on a remote server.

Referring again to FIG. 8, a computer screen display 500 shows a window 510 used to enter contractor timecard data in one embodiment of the present invention. Timecard name 530, dates spanning time worked 540, project or contractor ID 550, a description of services rendered 555, subtotals of hours worked 560 and hours worked 565 are entered in the appropriate spaces on the Timecard Details window 510. In step 260, the contractor submits the timecard for approval and payment by selecting "Submit for Approval" button 570.

FIG. 4B illustrates flow diagram of computer implemented steps relating to approver activity 270 in accordance with the procurement system with timecard functionality of one embodiment of the present invention. Submission of a timecard by a contractor generates an approval notification in step 275 that is transmitted, in one embodiment, by electronic mail to an approver. The approval notification is a special form that allows an approver to approve or decline all or part of the timecard information. In step 280, the approver sees the notification on email, opens the notification and reviews all timecard information along with the accounting code. The approver then interfaces with the approval form in step 285 and the form is then automatically transmitted electronically back to the procurement system 135 for processing. Such approved timecard data is processed as any other purchase requisition. As discussed above, by using this email approval technique, the approver need not directly log into the procurement system 135 to perform approvals.

If electronic mail is not used, then the approver may use a browser based system to log into the procurement system 135 via an Internet connection. Once logged in, e.g., via password and name, then the approver could request a list of all requests that need approval from him/her. The approval process is then performed directly with the procurement system 135.

FIG. 9 is an exemplary computer screen display 600 showing a window 610 used to display contractor timecard data presented for approval in one embodiment of the present invention. The approver can review and approve the request for processing and contractor payment by selecting the "Approve" 620 button. The request can also be denied by selecting the A"Decline" 630 button.

Figure 4C:
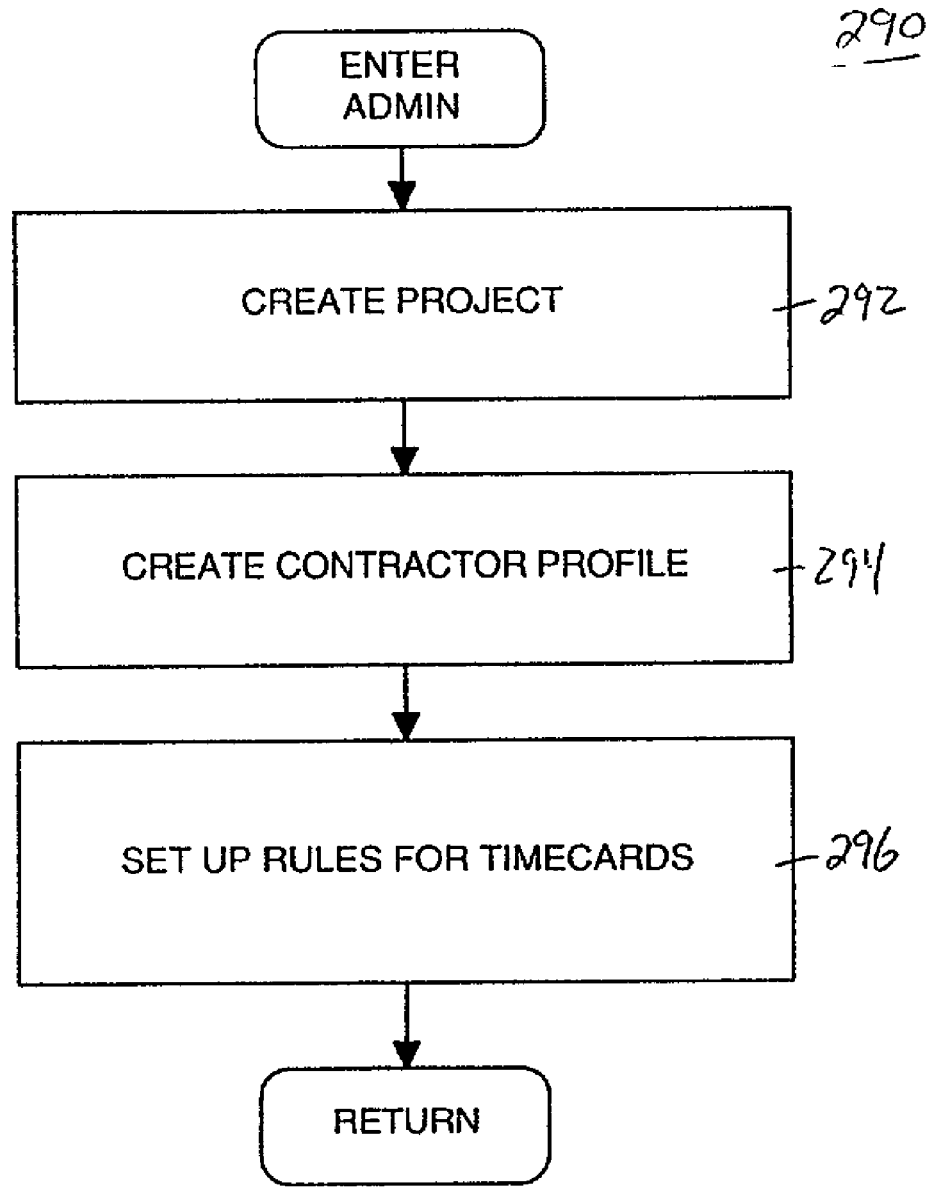
FIG. 4C illustrates a flow diagram of computer implemented steps relating to administrator activity in accordance with the procurement system with timecard functionality of one embodiment of the present invention.

FIG. 4C illustrates a flow diagram of computer implemented steps relating to administrator activity 290 in accordance with the procurement system with timecard functionality of one embodiment of the present invention. In step 292, an administrator creates a new project that is entered into the procurement system 135. A timecard projects table lists all the projects that can be associated with timecard line items. Project data includes project name, description, and the types of hours that are allowed for the particular project. Each entry in the timecard projects table has a unique identification number, ID, assigned by the system. The profile ID is a link that can be used to modify a project. Before a timecard project can be assigned to a specific contractor, the project must have been entered into the Timecard Project Table.

Figure 6:
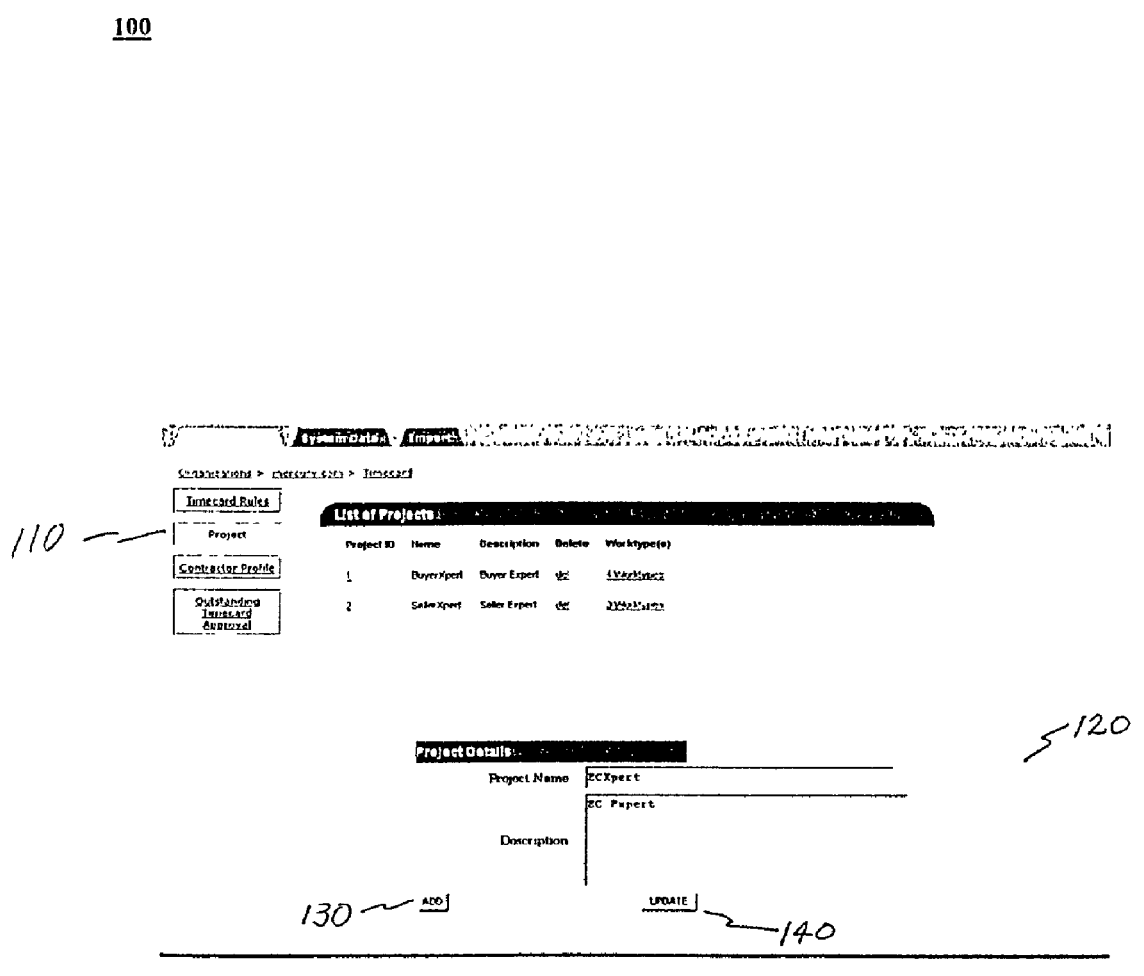

FIG. 6 is an exemplary computer screen display 100 showing a window used to set up a timecard project according to the present invention. This window is opened by first selecting timecards and then selecting project. Opening of the correct window is confirmed by the title for the window 110 displayed in the upper left corner. In the case of a new project, specific timecard project data including project name, description and hours allowed for the project are then entered into the open window 120. Selecting "ADD" 130 will then create a new project in the system which will assign a unique project ID. Modification of an existing project can be accomplished by first selecting "UPDATE" button 140 and then changing or adding data in the open window 120.

The system administrator creates a contractor profile in step 294 of FIG. 4C. The contractor Profile table contains the data required for each contractor previously established as a member within the procurement system 135 to enter billable hours into the timecard process. The contractor profile entered into this table include the contractor's name and company, projects the contractor is approved to work on as well as the type of work approved. The rate charged for the contractor's time and the type of currency used for calculating costs must also be entered. The administrative member having contractor approval authority is designated in the procurement system 135, and the accounting code is associated with this contractor. Each contractor has a unique ID assigned by the procurement system 135 that can be used to modify a contractor profile.

Figure 7:
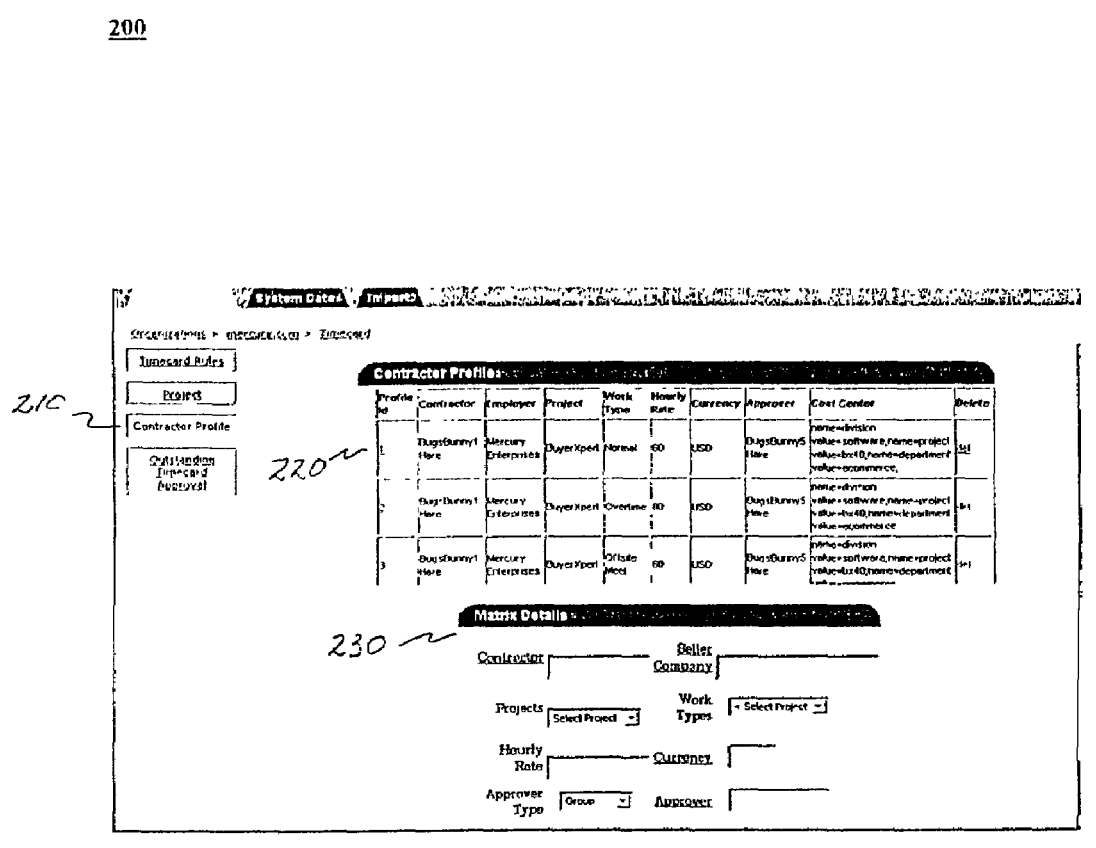

FIG. 7 is an exemplary computer screen display showing a window 200 used to set up a contractor profile according to the present invention. This window is opened by first selecting timecards and then selecting contractor profile. Opening of the correct window is confirmed by the title for the window 210 displayed in the upper left corner. To make changes to a Contractor Profile, select the associated Profile ID 220 and enter data in the fields of the Matrix Details 230. The profile for a new contractor is accomplished by simply entering the appropriate data in the Matrix Details 230 window.

In step 296 of FIG. 4C, the system administrator sets up business rules for the timecard process. The timecard business rules table should be configured before the timecard process can be used. These rules determine the availability of the timecard process to the user (contractor). Whenever the timecard process is available to the user, the timecard link is displayed on a computer welcome screen accessible by the user (contractor). The timecard business rules table includes requirements for the approval of contractor requests in accordance with company policy.

Figure 5:
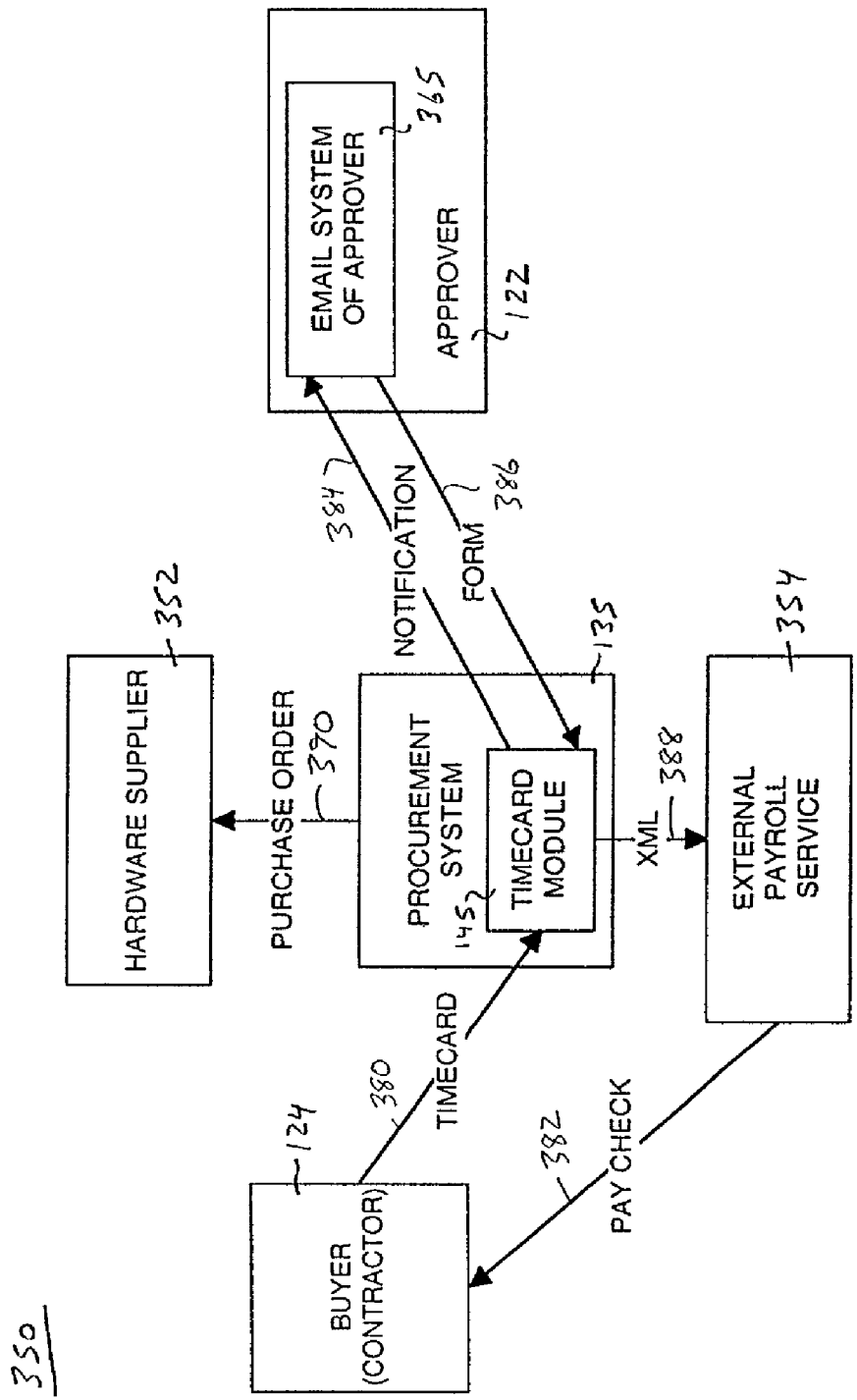
FIG. 5 illustrates a data flow diagram of interfaces between modules of the procurement system of one embodiment of the present invention for timecard generation and approval functionality.

FIG. 5 illustrates a data flow diagram 350 of interfaces between modules of the procurement system of one embodiment of the present invention for timecard generation and approval functionality.

In the buyer (contractor) module 124, a timecard is generated as a contractor enters number of hours worked, type of work performed, dates and/or times of work performed relative to a specific project that is identified with a unique ID. The contractor interface with the timecard module 145 that is integral with the procurement system 135 may be browser based so that timecard entry and generation can be performed by the contractor using the internet, with the timecard process system being hosted on a remote server. The timecard 380 contains separate line items. Each line item includes a description of activity, a hours amount and a hourly rate. Subtotals can also be included for projects, dates, etc.

Submission of a timecard 380 by a contractor generates an approval notification 384 that is transmitted from the timecard module 145 by electronic mail to the email system 365 of an approver 122. The approval notification includes a special form that allows an approver to approve or decline all or part of the timecard information. The notification, in one embodiment, can be read by an electronic mail reader program. Any of a number of well known email formats and protocols can be used.

The approver 122 sees the notification on email, opens the notification and reviews all timecard information along with accounting codes. An accounting code can be associated with every line item of the timecard information. The approver then interfaces with the approval form and the completed form 386 is then automatically transmitted electronically back to the timecard module 135 within the procurement system 135 for processing.

Approved timecard data is then processed by generating XML formatted timecard information 388 for export to external applications 354. Transmission of XML data may be performed using ECX. External services 354 receiving XML timecard information may include external payroll service 354 for generating payment to the contractor. A paycheck 382 is then forwarded from external payroll service 354 to the appropriate buyer (contractor) 124.

Ordinary purchase requisitions 390 generated by the procurement system 135 that are not subject to the timecard module 145 (e.g., purchase orders for goods) are communicated directly to hardware suppliers 352. In one embodiment of the present invention, portions of the procurement system may include BuyerXpert and ECXpert which are software products available from Sun Microsystems of Mountain View, Calif.

The preferred embodiment of the present invention, an integrated procurement software system for processing both timecard information and purchase order acquisitions, is thus described. While the present invention has been described in particular embodiments, it should be appreciated that the present invention should not be construed as limited by such embodiments, but rather construed according to the below claims.

What is claimed is:

1. A systems, comprising:
   a processor; and
   a memory coupled to the processor, wherein the memory comprises program instructions executable by the processor to implement:
   a computer implemented procurement module configured to process both purchase order requisitions each specifying one or more goods to be purchased and timecard information specifying time information related to one or more rendered services, said procurement module comprising:
      a buyer module configured to:
         receive information related to contractor services; and
         generate an electronic timecard in response thereto; and
      a timecard module configured to:
         receive one or more electronic timecards from said buyer module; and
         generate a purchase order based on one or more approved electronic timecards, wherein said purchase order is configured for use in generating a payment for said contractor services.

2. A system as described in claim 1 wherein said computer implemented procurement module further comprises a workflow module coupled to said timecard module, wherein said workflow module is configured to allow an approver to approve and decline said electronic timecards.

3. A system as described in claim 2 wherein said timecard module is further configured to generate an approval notification in response to receiving an electronic timecard from said buyer module.

4. A system as described in claim 3 wherein said approval notification is an electronic mail message comprising an approval form readable by said workflow module, wherein said timecard module is further configured to transmit said electronic mail message to an approver related to said contractor services.

5. A system as described in claim 4 wherein said approval form is readable by an electronic mail program, and wherein said computer implemented procurement system is configured to receive said approval form returned after being completed by said approver.

6. A system as described in claim 2 wherein said buyer module is configured to provide a browser based user interface, and wherein said procurement module is configured to be hosted on a remote server system.

7. A system as described in claim 2 wherein said computer implemented procurement system further comprises an external report generating module configured to generate information to be used by external applications, and wherein said external report generating module is configured to format said information using XML data.

8. A system as described in claim 2 wherein said electronic timecard comprises a plurality of line items describing said contractor services and comprising:
   a contractor identification;
   a description of services rendered;
   an amount of hours performed for said services rendered;
   an hourly rate for said hours; and
   subtotals representing said amount of hours by said hourly rate.

9. A system as described in claim 2 wherein said timecard module comprises a contractor profile for a contractor, said contractor profile comprising:
   a contractor identification;
   authorized projects for said contractor;
   authorized work types for said contractor;
   an authorized hourly rate for said contractor; and
   an approver for said contractor.

10. A system as described in claim 3 wherein said electronic timecard comprises a plurality of line items, and wherein said approval notification comprises information from said electronic timecard and an accounting code associated with each line item of said electronic timecard.

11. A method of approving an electronic timecard comprising:
   a) generating an electronic timecard comprising line items describing: a contractor; services rendered; hourly amounts; and hourly rates;
   b) in response to a), generating a notification to an approver associated with said contractor, said notification comprising an approval form and information related to said electronic timecard;
   c) in response to receiving said approval form indicating approval of said timecard, generating a purchase order comprising information from said timecard; and
   d) transmitting said purchase order to execute payment to said contractor of said timecard, wherein a)-d) are performed by a procurement system configured to process both purchase order requisitions each specifying one or more goods to be purchased and timecard information specifying time information related to one or more rendered services.

12. A method as described in claim 11 wherein a) is performed by a buyer using a browser based computer system and wherein said procurement system is hosted on a remote server from said buyer.

13. A method as described in claim 11 wherein said notification is a first electronic mail message transmitted to said approver and stored in an electronic mailbox.

14. A method as described in claim 13 further comprising transmitting said approval form from said approver to said procurement system via a second electronic mail message.

15. A method as described in claim 13 wherein said notification comprises accounting codes associated with said line items of said timecard.

16. A method as described in claim 11 wherein d) is performed using XML data.

17. A computer system comprising:
   a processor coupled to a bus;
   a memory coupled to said bus and comprising program instructions executable by the processor to implement a method of approving an electronic timecard comprising:
      a) generating an electronic timecard comprising line items describing: a contractor; services rendered; hourly amounts; and hourly rates;
      b) in response to a), generating a notification to an approver associated with said contractor, said notification comprising an approval form and information related to said electronic timecard;

c) in response to receiving said approval form indicating approval of said timecard, generating a purchase order comprising information from said timecard; and d) transmitting said purchase order to execute payment to said contractor of said timecard, wherein a)-d) are performed by a procurement system configured to process both purchase order requisitions each specifying one or more goods to be purchased and timecard information specifying time information related to one or more rendered services.

18. A computer system as described in claim 17 wherein as part of a) the instructions are further executable to provide a browser based user interface to a buyer, and wherein said procurement system is configured to be hosted on a remote server from said buyer.

19. A computer system as described in claim 17 wherein said notification is a first electronic mail message transmitted to said approver and stored in an electronic mailbox.

20. A computer system as described in claim 19 wherein said method further comprises transmitting said approval form from said approver to said procurement system via a second electronic mail message.

21. A computer system as described in claim 19 wherein said notification comprises accounting codes associated with said line items of said timecard.

22. A computer system as described in claim 17 wherein d) is performed using XML data.

* * * * *